US008977452B2

(12) United States Patent
Masunaga et al.

(10) Patent No.: US 8,977,452 B2
(45) Date of Patent: Mar. 10, 2015

(54) CONTROLLER AND CONTROL METHOD FOR VEHICLE

(71) Applicants: Seiji Masunaga, Susono (JP); Yoshio Hasegawa, Chiryu (JP); Keisuke Ota, Toyota (JP)

(72) Inventors: Seiji Masunaga, Susono (JP); Yoshio Hasegawa, Chiryu (JP); Keisuke Ota, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/959,154

(22) Filed: Aug. 5, 2013

(65) Prior Publication Data

US 2014/0046560 A1 Feb. 13, 2014

(30) Foreign Application Priority Data

Aug. 7, 2012 (JP) ................................. 2012-175173

(51) Int. Cl.
*F16H 61/02* (2006.01)
*B60W 10/11* (2012.01)
*B60W 10/06* (2006.01)
*F16H 61/06* (2006.01)
*F16H 59/14* (2006.01)
*F16H 59/42* (2006.01)
*F16H 61/00* (2006.01)

(52) U.S. Cl.
CPC .............. *B60W 10/11* (2013.01); *B60W 10/06* (2013.01); *F16H 61/061* (2013.01); *F16H 2059/148* (2013.01); *F16H 2059/147* (2013.01); *F16H 2059/425* (2013.01); *F16H 2061/009* (2013.01)
USPC .......................................................... 701/58

(58) Field of Classification Search
USPC ........ 701/51–56, 58, 62, 64, 87, 95; 180/336, 180/375, 377, 269
See application file for complete search history.

(56) References Cited

U.S. PATENT DOCUMENTS

| | | | |
|---|---|---|---|
| 6,754,574 B2 * | 6/2004 | Tokura et al. | 701/67 |
| 7,440,833 B2 * | 10/2008 | Chen | 701/51 |
| 7,771,316 B2 * | 8/2010 | Honma et al. | 477/130 |
| 7,912,614 B2 * | 3/2011 | Honma et al. | 701/51 |
| 7,963,267 B2 * | 6/2011 | Surnilla et al. | 123/198 F |
| 8,280,597 B2 * | 10/2012 | Takahashi et al. | 701/51 |
| 8,571,758 B2 * | 10/2013 | Klier et al. | 701/41 |
| 2007/0093358 A1 * | 4/2007 | Ayabe et al. | 477/97 |
| 2007/0105682 A1 * | 5/2007 | Inuta | 475/116 |

(Continued)

FOREIGN PATENT DOCUMENTS

| | | |
|---|---|---|
| JP | 2000-097325 A | 4/2000 |
| WO | 2014/020685 A1 | 2/2014 |

*Primary Examiner* — John R Olszewski
*Assistant Examiner* — James M McPherson
(74) *Attorney, Agent, or Firm* — Sughrue Mion, PLLC

(57) ABSTRACT

In a vehicle control, an automatic transmission is shifted using a predetermined shift model, which determines control operation amounts for achieving shift target values, by setting the shift target values on the basis of a torque on an output shaft-side rotating member and a speed variation amount of an input shaft-side rotating member, setting the control operation amounts on the basis of a torque on the input shaft-side rotating member, a torque capacity of an engaged-side engagement device during shifting and a torque capacity of a released-side engagement device during shifting and setting torque shares of a transmission torque between the engaged-side engagement device and the released-side engagement device during shifting when the transmission torque is converted to the torque on the input shaft-side rotating member, and timing at which the torque shares are varied is changed on the basis of a shift pattern.

3 Claims, 6 Drawing Sheets

(56) References Cited

U.S. PATENT DOCUMENTS

| | | |
|---|---|---|
| 2008/0004159 A1* | 1/2008 | Kubonoya et al. ............ 477/115 |
| 2008/0220933 A1* | 9/2008 | Maeda .............................. 477/3 |
| 2011/0212804 A1* | 9/2011 | Imamura et al. ............... 475/150 |
| 2012/0290163 A1* | 11/2012 | Inagaki et al. .................. 701/22 |
| 2013/0045833 A1* | 2/2013 | Okubo et al. ...................... 477/5 |

* cited by examiner

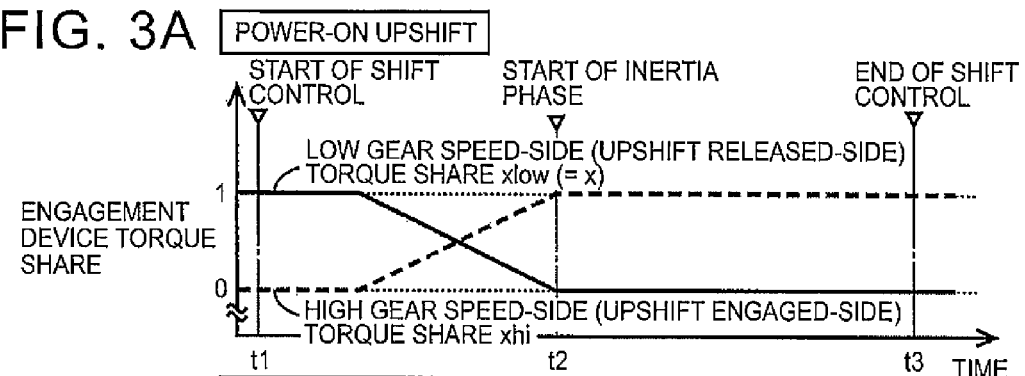
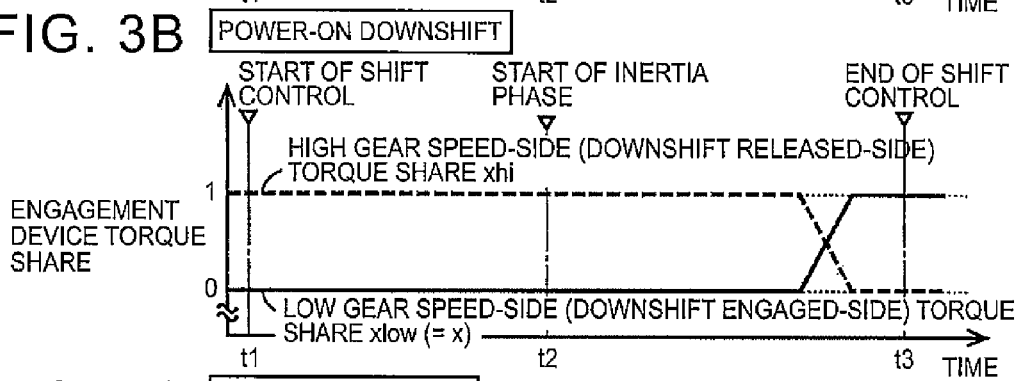
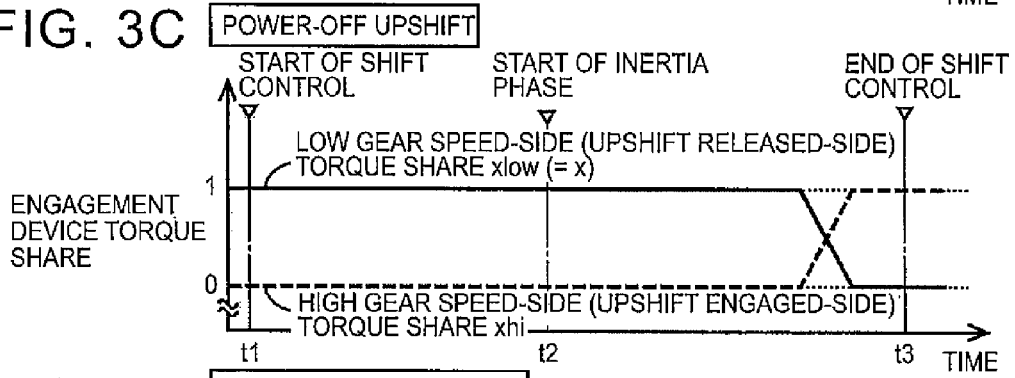
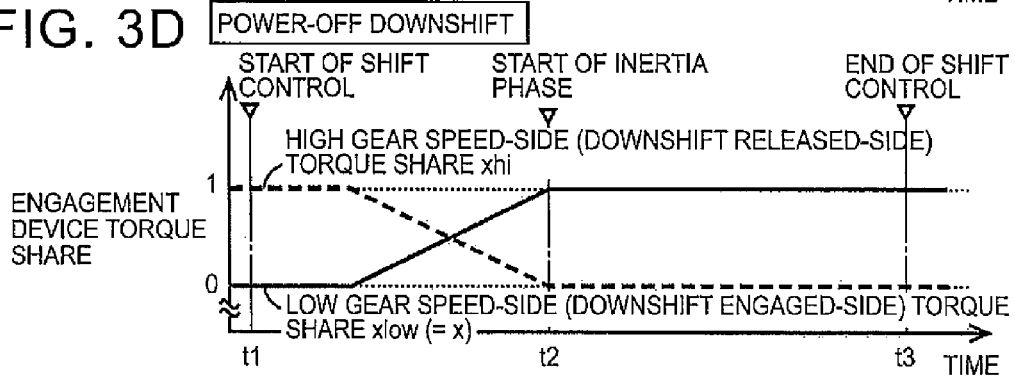

FIG. 6

|  | POWER-ON SHIFT | POWER-OFF SHIFT |
|---|---|---|
| UPSHIFT | RELEASED-SIDE ENGAGEMENT DEVICE | ENGAGED-SIDE ENGAGEMENT DEVICE |
| DOWNSHIFT | ENGAGED-SIDE ENGAGEMENT DEVICE | RELEASED-SIDE ENGAGEMENT DEVICE |

CONTROLLER AND CONTROL METHOD FOR VEHICLE

INCORPORATION BY REFERENCE

The disclosure of Japanese Patent Application No. 2012-175173 filed on Aug. 7, 2012 including the specification, drawings and abstract is incorporated herein by reference in its entirety.

BACKGROUND OF THE INVENTION

1. Field of the Invention

The invention relates to a controller and control method for a vehicle, which execute shift control over an automatic transmission, and, more particularly, to a technique for shifting an automatic transmission with the use of a shift model.

2. Description of Related Art

There is well known an automatic transmission that includes a plurality of engagement devices, which transmit rotation and torque between an input shaft that receives power from a driving force source and an output shaft that transmits power to drive wheels, and that is shifted by switching between engaged and released states of each of the engagement devices. Generally, in such an automatic transmission, a required value (that is, a control operation amount) of an element (for example, torque, or the like) that is operated for a controlled object is adapted for each gear speed while carrying out evaluations in an actual vehicle, and a shift is carried out using the control operation amount that is determined from a control map obtained in advance for each gear speed on the basis of the adapted result. However, with an increasing number of speeds of an automatic transmission, enormous effort is required for adaptation work, and it is becoming more difficult to employ a mode of shift control based on control maps. Therefore, there is suggested shift model control that is a mode of shift control based on the equation of motion in each of rotating elements that constitute an automatic transmission. In such shift model control, a control operation amount is uniquely determined by solving the equations of motion obtained in advance on the basis of a desired variation mode (shift target value) during shifting, and a shift is carried out using the determined control operation amount. For example, Japanese Patent Application Publication No. 2000-97325 (JP 2000-97325 A) describes a technique for carrying out a shift by, in inertia phase control, setting a target value of an input shaft rotation speed of a transmission as a shift target value and calculating a required value of an engaged-side clutch torque as a control operation amount with the use of a shift model, and a technique for carrying out a shift by setting a target value of an input shaft rotation speed of a transmission and a target value of an output shaft torque of the transmission as shift target values and calculating a required value of an engaged-side clutch torque and a required value of a released-side clutch torque as control operation amounts with the use of a shift model.

SUMMARY OF THE INVENTION

In the technique described in JP 2000-97325 A, a shift is carried out by operating one controlled object for one shift target value or operating two controlled objects for two shift target values. However, in the technique described in JP 2000-97325 A, in order to cancel inertia torque during inertia phase (in other words, in order for output shaft torque during inertia phase not to substantially vary), the hydraulic pressure of the released-side engagement device is gradually decreased for release and is then temporarily gradually increased for engagement again, so there is a possibility that completion of a shift delays and drivability deteriorates. On the other hand, in order to cancel the inertia torque, there is well known a technique that is so-called engine torque reduction control for temporarily decreasing engine torque during inertia phase. However, in the technique described in JP 2000-97325 A, an engine is not incorporated into the equations of motion as a controlled object. That is, in the technique described in JP 2000-97325 A, the equation of motion is solved for a current engine torque, so, in the shift model control described in JP 2000-97325 A, it is not possible to cancel inertia torque through engine torque reduction control instead of a temporal increase in hydraulic pressure of the released-side engagement device. At this time, it is possible to execute engine torque reduction control separately from shift model control. However, in this case, the overall shift model control collapses, and a solution is derived from the equations of motion again, so eventually there is a possibility that completion of a shift delays, a shift shock increases and drivability deteriorates. On the other hand, if an engine torque is attempted to be uniquely determined as a control operation amount in shift model control, there are three control operation amounts for two shift target values. Therefore, it is not possible to solve the equations of motion, and it is not possible to shift the automatic transmission using shift model control. The above-described problem is not known, and appropriately setting a constraint condition for solving the equations of motion so as to be compatible with any shift pattern (shift mode) of a power-on upshift, a power-off upshift, a power-on downshift and a power-off downshift with the use of one shift model has not been suggested yet.

The invention provides a controller and control method for a vehicle, which are able to carry out a desired shift of an automatic transmission with the use of a shift model.

A first aspect of the invention relates to a controller for a vehicle. The vehicle includes an automatic transmission that has a plurality of engagement devices, the plurality of engagement devices transmitting rotation and torque between an input shaft that receives power from a driving force source and an output shaft that transmits power to a drive wheel, the automatic transmission being shifted by switching between engaged and released states of each of the engagement devices. The controller includes a shift control unit configured to i) carry out a shift of the automatic transmission with the use of a predetermined shift model that determines control operation amounts for achieving shift target values, ii) carry out the shift of the automatic transmission with the use of the shift model by setting the shift target values on the basis of a torque on a rotating member on the output shaft side and a speed variation amount of a rotating member on the input shaft side, setting the control operation amounts on the basis of a torque on the rotating member on the input shaft side, a torque capacity of an engaged one of the engagement devices during the shift and a torque capacity of a released one of the engagement devices during the shift, and setting torque shares of a transmission torque between the engaged one of the engagement devices and the released one of the engagement devices during the shift when the transmission torque is converted to the torque on the rotating member on the input shaft side, and iii) change timing at which the torque shares are varied on the basis of a shift pattern.

With this configuration, in a situation that, when the three control operation amounts need to be determined in order to achieve the two shift target values, it is not possible to determine those control operation amounts unless a constraint condition is set. For this reason, the torque shares of the transmission torque between the released one of the engagement devices and the engaged one of the engagement devices is set as the constraint condition, so it is suitable for controlling an exchange of torque between the released one of the engagement devices and the engaged one of the engagement devices (that is, shift progress degree), which is difficult in shift control, and it is possible to determine the three control operation amounts. In other words, in the case where any one of the control operation amounts is set to a predetermined value in order to determine the three control operation amounts, there are an infinite number of the predetermined values. For example, the any one of the control operation amounts is set to a predetermined value suitable for each shift pattern. In contrast to this, according to the invention, the torque shares that express an exchange of torque are set as the constraint condition, so it is possible to handle any shift pattern with the use of a single shift model. Specifically, when only one of the torque capacity of the engaged-side engagement device and the torque capacity of the released-side engagement device is set as the constraint condition, there is a possibility that tie-up or racing of a rotating member may occur. However, by setting the torque shares suitable for controlling the shift progress degree as the constraint condition, occurrence of the tie-up or racing is suppressed, and, conversely, controllability of control for causing tie-up or racing on purpose improves. In addition, when the torque on the rotating member on the input shaft side is set as the constraint condition, there is a possibility that it is not possible to execute control for temporarily varying the output torque of a driving force source. However, according to the invention, for example, it is possible to appropriately execute torque reduction control for temporarily reducing the output torque of the driving force source during inertia phase. In this way, according to the invention, even when there are three control operation amounts for two shift target values, it is possible to appropriately determine the three control operation amounts with the use of the shift model and then carry out a desired shift of the automatic transmission such that the two shift target values are achieved.

Incidentally, in shift control over the automatic transmission, there are various shift patterns (shift modes), such as a power-on upshift, a power-off upshift, a power-on downshift and a power-off downshift. When the shift pattern varies, the manner of progress of a shift also varies. When the torque shares are set uniformly, there is a possibility that it is not possible to carry out an appropriate shift depending on a shift pattern. Therefore, it is desirable to set the torque shares in accordance with each shift pattern. For the above inconvenience, in the first aspect, additionally, the timing at which the torque shares are varied is changed on the basis of the shift pattern, that is, the timing at which torque is exchanged between the released-side engagement device and the engaged-side engagement device is changed, so it is possible to cause the shift to appropriately progress in accordance with the shift pattern. Thus, according to the invention, it is possible to further appropriately carry out a desired shift of the automatic transmission with the use of the shift model.

In the controller, the shift control unit may be configured to set the timing at which the torque shares are varied to timing before a start of inertia phase when the shift pattern is a power-on upshift or a power-off downshift. The shift control unit may be configured to set the timing at which the torque shares are varied to an end of inertia phase when the shift pattern is a power-off upshift or a power-on downshift. With this configuration, in a power-on upshift or a power-off downshift, a direction in which the rotation speed of the rotating member on the input shaft side is varied by torque (including not only a positive torque but also a negative torque) generated by the driving force source differs from a variation direction of the rotation speed as a result of the shift (direction in which the rotation speed is varied as a result of the shift), that is, it is not possible to cause the shift to spontaneously progress using the torque generated by the driving force source. In this situation, the timing at which the torque shares are varied is set to timing before the start of inertia phase, so the shift is caused to appropriately progress by the engaged-side engagement device. On the other hand, in a power-off upshift or a power-on downshift, the rotation speed of the rotating member on the input shaft side is varied in the variation direction as a result of the shift by the torque generated by the driving force source, that is, it is possible to cause the shift to spontaneously progress using the torque generated by the driving force source. In this situation, the timing at which the torque shares are varied is set to the end of inertia phase, so the shift is caused to appropriately progress by decreasing only the absolute value of the torque of the released-side engagement device without changing the torque shares (that is, only by gradually releasing the released-side engagement device). In other words, in a power-off upshift or a power-on downshift, when the timing at which the torque shares are varied is set to the timing before the start of inertia phase and the shift is caused to progress by the engaged-side engagement device, there is a possibility that inertia torque increases and a shift shock deteriorates. In contrast, by engaging the engaged-side engagement device such that the rotation is adjusted to post-shift synchronous rotation while the shift is caused to progress by the torque of the driving force source and releasing of the released-side engagement device, it is possible to achieve a smooth shift.

In the controller, the shift control unit may be configured to calculate the control operation amounts on the basis of the shift target values by using an equation of motion of the automatic transmission and a relationship, as the shift model. The equation includes the shift target values and the control operation amounts. The relationship expresses the torque shares. With this configuration, it is possible to incorporate control associated with an exchange of torque between the released-side engagement device and the engaged-side engagement device, which is difficult in shift control, into the equation of motion, so it is possible to appropriately determine the three control operation amounts.

In the controller, the shift control unit may be configured to determine a torque capacity of a predetermined engagement device, selected from between the engaged-side engagement device and the released-side engagement device, using a torque share, including a tie-up rate, as the torque share. The shift control unit is configured to change the predetermined engagement device on the basis of the shift pattern. With this configuration, at the time when the shift target values significantly change, such as the start of inertia phase and the end of inertia phase during shifting, if the control operation amount of the torque capacity of one of the released-side engagement device and the engaged-side engagement device is zero, an actual torque on the rotating member on the output shaft side or an actual speed of the rotating member on the input shaft side more rapidly varies than the shift target values due to a response delay, variations, and the like, of an actual torque capacity with respect to the control operation amount or the rotation speed of the rotating member on the input shaft side steeply increases and, as a result, a shift shock may increase. In contrast, by controlling an exchange of the torque toward tie-up side, it is possible to smoothly exchange the torque, it is possible to share the rapidly varied amount at the predetermined engagement device or it is possible to suppress the racing, so it is possible to suppress a shift shock that may increase at the time when the shift target values significantly change. In addition, the predetermined engagement device is changed on the basis of the shift pattern, so it is possible to further appropriately suppress a shift shock in accordance with the shift pattern.

In the controller, the shift control unit may be configured to set the released-side engagement device as the predetermined engagement device when the shift pattern is a power-on upshift or a power-off downshift. The shift control unit is configured to set the engaged-side engagement device as the predetermined engagement device when the shift pattern is a power-off upshift or a power-on downshift. With this configuration, even when the torque capacities of the engagement devices are increased in order to cause tie-up, it is less likely to influence the transmission torque and, by extension, the torque on the rotating member on the output shaft side or it is less likely to influence the progress of the shift. For example, when the timing at which the torque shares are varied is set to the timing before the start of inertia phase in a power-on upshift or a power-off downshift, by adding a tie-up amount to the torque capacity of the released-side engagement device, a rapid variation in actual torque on the rotating member on the output shaft side or a rapid variation in the speed of the rotating member on the input shaft side after the start of inertia phase is appropriately suppressed without influencing the torque on the rotating member on the output shaft side before the start of inertia phase. On the other hand, when the timing at which the torque shares are varied is set to the end of inertia phase in a power-off upshift or a power-on downshift, by adding a tie-up amount to the torque capacity of the engaged-side engagement device, racing, or the like, of the rotating member on the input shaft side at the end of inertia phase is appropriately suppressed while making it less likely to influence the progress of the shift through releasing of the released-side engagement device.

A second aspect of the invention relates to a control method for a vehicle. The vehicle includes an automatic transmission that has a plurality of engagement devices that transmit rotation and torque between an input shaft that receives power from a driving force source and an output shaft that transmits power to a drive wheel, and that carries out a shift by switching between engagement and release of the engagement devices. The control method includes: carrying out a shift of the automatic transmission with the use of a predetermined shift model that determines control operation amounts for achieving shift target values; carrying out the shift of the automatic transmission with the use of the shift model by setting the shift target values on the basis of a torque on a rotating member on the output shaft side and a speed variation amount of a rotating member on the input shaft side, setting the control operation amounts on the basis of a torque on the rotating member on the input shaft side, a torque capacity of an engaged one of the engagement devices during the shift and a torque capacity of a released one of the engagement devices during the shift and setting torque shares of a transmission torque between the engaged one of the engagement devices and the released one of the engagement devices during the shift when the transmission torque is converted to the torque on the rotating member on the input shaft side; and changing timing at which the torque shares are varied on the basis of a shift pattern.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a view that shows an example of timing at which torque shares are varied, which is predetermined for a power-on upshift;

FIG. 3B is a view that shows an example of timing at which the torque shares are varied, which is predetermined for a power-on downshift;

FIG. 3C is a view that shows an example of timing at which the torque shares are varied, which is predetermined for a power-off upshift;

FIG. 3D is a view that shows an example of timing at which the torque shares are varied, which is predetermined for a power-off downshift;

FIG. 6 is a table that shows an example of an engagement device to which a tie-up degree is added and that is changed on the basis of the shift pattern.

DETAILED DESCRIPTION OF EMBODIMENTS

According to the invention, the vehicle, for example, transmits power of the driving force source to the drive wheel via a power transmission device, such as the automatic transmission. In addition, the automatic transmission is a step-gear automatic transmission in which a plurality of speeds (gear speeds) respectively having different speed ratios (gear ratios) are alternatively established by switching between engaged and released states of each of predetermined engagement devices. For example, the step-gear automatic transmission is a known planetary gear-type automatic transmission. Engagement devices, such as multi-disc or single-disc clutches and brakes that are engaged by corresponding hydraulic actuators and a band brake, are widely used as engagement devices in the planetary gear-type automatic transmission. The vehicle, for example, includes a hydraulic control circuit that supplies hydraulic pressures to the hydraulic actuators of the plurality of engagement devices, respectively. The hydraulic control circuit, for example, includes linear solenoid valves, on-off solenoid valves, and the like, and supplies output hydraulic pressures of those solenoid valves respectively to the hydraulic actuators of the engagement devices directly or indirectly via a shift control valve, or the like. The above "supplying a hydraulic pressure" means "applying a hydraulic pressure" or "supplying hydraulic fluid controlled to a certain hydraulic pressure".

An engine, such as a gasoline engine and a diesel engine, may be used as the driving force source. Alternatively, a prime mover, such as an electric motor, may be used solely or in combination with the engine as the driving force source.

Hereinafter, an embodiment (first embodiment) of the invention will be described with reference to the accompanying drawings.

Figure 1:
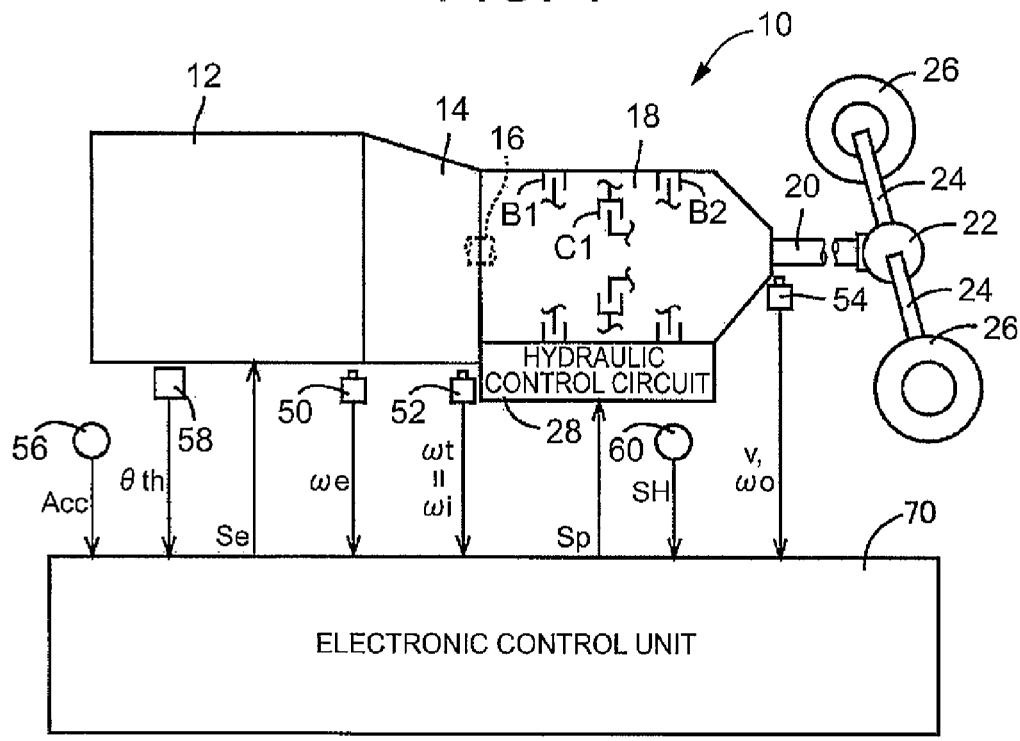
FIG. 1 is a view that illustrates the schematic configuration of a power transmission path in a vehicle to which the invention is applied and is a view that illustrates a relevant portion of a control system provided in the vehicle.

FIG. 1 is a view that illustrates the schematic configuration of a power transmission path from an engine 12 mounted on a vehicle 10, to which the invention is applied, to drive wheels 26, and is a view that illustrates a relevant portion of a control system provided in the vehicle 10. In FIG. 1, power generated by the engine 12 that serves as a driving force source is passed through a torque converter 14 and input from an input shaft 16 to the automatic transmission 18, and then transmitted from an output shaft 20 of the automatic transmission 18 to the right and left drive wheels 26 sequentially via a differential gear unit (differential gear) 22, a pair of axles (drive shafts) 24, and the like.

The automatic transmission 18 is a known planetary gear-type automatic transmission that includes a single set or multiple sets of planetary gear units and a plurality of engagement devices (engagement elements) in a transmission case. A plurality of gear speeds are alternatively established by the engagement devices in the automatic transmission 18. The transmission case serves as a non-rotating member connected to a vehicle body. For example, the automatic transmission 18 is a step-gear transmission that carries out a so-called clutch-to-clutch shift and in which a shift is carried out by engaging any one of the plurality of engagement devices and releasing any one of the plurality of engagement devices (that is, switching between engaged and released states of each of any two of the engagement devices). The plurality of engagement devices each are a hydraulic friction engagement device that transmits rotation and torque between the input shaft 16 that receives power from the engine 12 and, the output shaft 20 that transmits power to the drive wheels 26. The input shaft 16 is an input shaft of the automatic transmission 18, and is also a turbine shaft that is driven for rotation by a turbine impeller of the torque converter 14.

The hydraulic friction engagement devices are clutches and brakes, each of which is controlled to be engaged or released by a hydraulic control circuit 28. A torque capacity, that is, engagement force, of each hydraulic friction engagement, device is varied by regulating a pressure applied to a corresponding one of the solenoid valves, and the like, in the hydraulic control circuit 28 and selectively coupling members on both sides of the hydraulic friction engagement device. Here, the torque capacity (hereinafter, referred to as clutch torque) of each engagement device is, for example, determined on the basis of the friction coefficient of a friction material of the engagement device and an engagement hydraulic pressure that presses a friction plate. In order to transmit torque (for example, transmission input torque Ti, that is, turbine torque Tt, input to the input shaft 16) between the input shaft 16 and the output shaft 20 without a slip of each engagement device (that is, without occurrence of a differential rotation speed in each engagement device), a torque capacity that allows a transmission torque amount shared between the engagement devices for that torque (that is, a torque shared between the engagement devices) is required. However, at the torque capacity that allows the transmission torque amount, the transmission torque does not increase any more even when the torque capacity is increased. In the present embodiment, for the sake of convenience, clutch torque and engagement hydraulic pressure may be handled as being synonymous with each other.

As an example of gear speeds in the automatic transmission 18, for example, a low vehicle speed-side gear speed (low gear speed, for example, first gear speed) is established by engaging a clutch C1 and a brake B1, and a high vehicle speed-side gear speed (high gear speed, for example, second gear speed) is established by engaging the clutch C1 and a brake B2. Thus, at the time of a shift between the low gear speed and the high gear speed, one of the brake B1 and the brake B2 is engaged, and the other one of the brake B1 and the brake B2 is released. In the present embodiment, between the engagement devices, one of which is engaged and the other one of which is released during shifting, the engagement device associated with establishment of the low gear speed (for example, the brake B1) is termed low gear speed engagement device, and the engagement device associated with establishment of the high gear speed (for example, the brake B2) is termed high gear speed engagement device. The low gear speed engagement device serves as a released-side engagement device at the time of an upshift from the low gear speed to the high gear speed, and serves as an engaged-side engagement device at the time of a downshift from the high gear speed to the low gear speed. On the other hand, the high gear speed engagement device serves as an engaged-side engagement device at the time of the upshift, and serves as a released-side engagement device at the time of the downshift.

Referring back to FIG. 1, the vehicle 10 includes an electronic control unit 70 that includes a shift control unit associated with, for example, shift control over the automatic transmission 18, and the like. The electronic control unit 70 is configured to include a so-called microcomputer that includes, for example, a CPU, a RAM, a ROM, an input/output interface, and the like. The CPU executes various controls over the vehicle 10 by carrying out signal processing in accordance with a program stored in the ROM in advance while utilizing a temporary storage function of the RAM. For example, the electronic control unit 70 is configured to execute output control over the engine 12, shift control over the automatic transmission 18, and the like, and is formed separately in a unit for engine control, a unit for hydraulic pressure control (shift control), and the like, as needed. Various signals detected by various sensors are supplied to the electronic control unit 70. The various sensors, for example, include rotation speed sensors 50, 52, 54, an accelerator operation amount sensor 56, a throttle opening degree sensor 58, a shift sensor 60, and the like. The various signals, for example, include an engine rotation speed $\omega e$ that indicates the rotation speed of the engine 12, a turbine rotation speed $\omega t$, that is, a transmission input rotation speed $\omega i$, that indicates the rotation speed of the input shaft 16, a transmission output rotation speed $\omega o$ that indicates the rotation speed of the output shaft 20, which corresponds to a vehicle speed V, an accelerator operation amount Acc that indicates a driver's required amount of driving force (driving torque) of the vehicle 10, a throttle valve opening degree $\theta th$, a shift operation SH through a shift lever or a paddle switch, and the like. In addition, for example, an engine output control command signal Se, a hydraulic pressure command signal Sp, and the like, are output from the electronic control unit 70. The engine output control command signal Se is used to execute output control over the engine 12. The hydraulic pressure command signal Sp is used to operate the hydraulic control circuit 28 that controls the hydraulic actuators of the automatic transmission 18.

Figure 2:
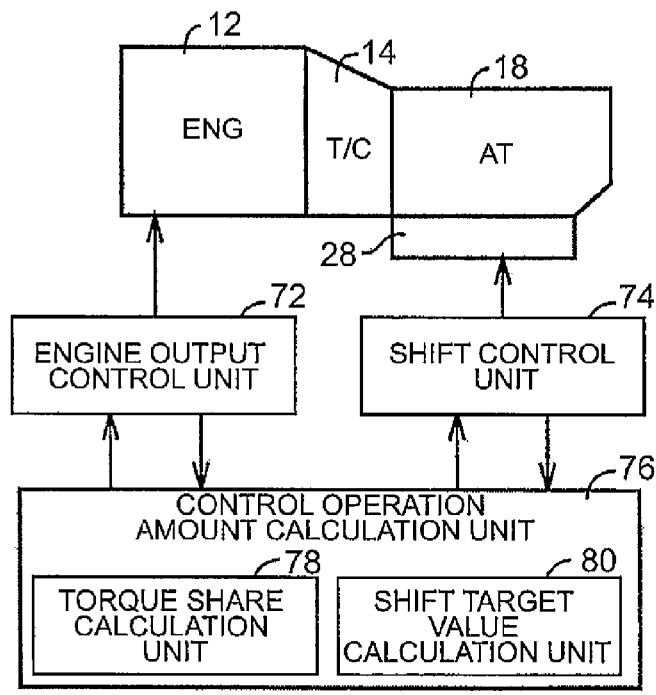
FIG. 2 is a functional block diagram that illustrates a relevant portion of control functions of an electronic control unit.

FIG. 2 is a functional block diagram that illustrates a relevant portion of control functions of the electronic control unit 70. In FIG. 2, an engine output control unit 72 not only executes open/close control over an electronic throttle valve with the use of a throttle actuator for throttle control but also controls a fuel injection amount from a fuel injection device for fuel injection amount control and outputs the engine output control command signal Se that controls an ignition device, such as an igniter, for ignition timing control such that, for example, a required engine torque Te (hereinafter, required engine torque Tedem) is obtained. The engine output control unit 72, for example, calculates a required driving force Fdem on the basis of an actual accelerator operation amount Acc and an actual vehicle speed V from a prestored correlation (not shown) (driving force map) between a vehicle speed V and a required driving force Fdem using the accelerator operation amount Acc as a parameter. Then, the engine output control unit 72, for example, calculates the required engine torque Tedem, by which the required driving force Fdem is obtained, on the basis of a tire effective radius of each drive wheel 26, a gear ratio at the current gear speed of the automatic transmission 18, a final reduction ratio in the drive wheel 26-side power transmission path with respect to the output shaft 20 and a torque ratio t of the torque converter 14. The torque ratio t of the torque converter 14 is, for example, calculated on the basis of an actual speed ratio e from a prestored known correlation (the operation characteristic chart of the torque converter 14) between a speed ratio (=turbine rotation speed $\omega t$/pump rotation speed $\omega p$ (engine rotation speed $\omega e$)) and a torque ratio t, efficiency and capacity coefficient.

A shift control unit 74 executes shift control over the automatic transmission 18. Specifically, the shift control unit 74 executes shift determination on the basis of a vehicle state indicated by an actual vehicle speed V and an actual accelerator operation amount Acc from a prestored known correlation (shift map, shift line map) using the vehicle speed V and the accelerator operation amount Acc as variables. Then, when the shift control unit 74 has determined to carry out a shift of the automatic transmission 18, the shift control unit 74 executes automatic shift control over the automatic transmission 18 such that a gear speed into which the automatic transmission 18 should be shifted is obtained. For example, the shift control unit 74 outputs the hydraulic pressure command signal Sp for engaging and/or releasing the engagement devices associated with a shift of the automatic transmission 18 to the hydraulic control circuit 28 such that the determined gear speed is achieved. The hydraulic pressure command signal Sp includes, for example, a hydraulic pressure command value for obtaining the torque capacity of the low gear speed engagement device (hereinafter, referred to as low gear speed-side clutch torque) and a hydraulic pressure command value for obtaining the torque capacity of the high gear speed engagement device (hereinafter, referred to as high gear speed-side clutch torque).

Here, shift control may be executed in accordance with a method of carrying out a shift of the automatic transmission 18 by, for example, determining the torque capacities (or hydraulic pressure command values) during shifting from a control map that is predetermined through adaptation while evaluations are carried out in an actual vehicle whether a shift shock, a shift duration, and the like, are appropriate. In such a method that uses the control map, it is required to create individually different control maps on the basis of which is the shift pattern, a power-on upshift, a power-off upshift, a power-on downshift or a power-off downshift, and between which speeds a shift is carried out. Therefore, as the number of gear speeds of the automatic transmission 18 increases, larger amounts of effort, and the like, are required for the above adaptation work.

In the present embodiment, instead of the above-described method that uses the control map, a method of carrying out a shift of the automatic transmission 18 with the use of a predetermined shift model that determines control operation amounts for achieving shift target values is employed as shift control. The shift target values are target values of elements (for example, shift duration, driving force, and the like) that determine a desired variation mode during shifting. The control operation amounts are required values of elements (engine torque, clutch torque, and the like) that are operated for controlled objects.

Hereinafter, shift control over the automatic transmission 18 with the use of the shift model will be described in detail. The equations of motion during a shift of the automatic transmission 18 are expressed by the following mathematical expression (1) and mathematical expression (2). The mathematical expression (1) and the mathematical expression (2) are derived from the equation of motion of each of mutually coupled rotating elements that constitute the automatic transmission 18 and a relational expression in the planetary gear unit that constitutes the automatic transmission 18. The equation of motion of each of the rotating elements is the equation of motion that defines a torque, expressed by the product of inertia and a time rate of change in rotation speed in the rotating element, using torques that respectively act on three members (sun gear, carrier, ring gear) of the planetary gear unit and one of members on both sides of each engagement device, associated with the rotating element. In addition, the relational expression in the planetary gear unit is a relational expression that defines the correlation in torque and the correlation in time rate of change in rotation speed among the three members of the planetary gear unit using the gear ratio of the planetary gear unit (=the number of teeth of the sun gear/the number of teeth of the ring gear). In the mathematical expression (1) and the mathematical expression (2), $d\omega t/dt$ denotes a time derivative, that is, a time rate of change of the turbine rotation speed $\omega t$ (that is, the transmission input rotation speed $\omega i$), and denotes an angular acceleration of the input shaft 16 (hereinafter, input shaft angular acceleration) as a variation in the speed of the input shaft 16-side rotating member (in the drawings and the mathematical expressions, the time rate of change is indicated with a $\dot{\omega}t$, and the same applies to the following description). $d\omega o/dt$ denotes a time rate of change in the transmission output rotation speed $\omega o$, and denotes an output shaft angular acceleration. Tt denotes a turbine torque, that is, a transmission input torque Ti, that is a torque on the input shaft 16 as a torque on the input shaft 16-side rotating member. The turbine torque Tt is equivalent to an engine torque Te (=Tt/t) when the torque ratio t of the torque converter 14 is taken into consideration. To denotes a transmission output torque that is a torque on the output shaft 20 as a torque on the output shaft 20-side rotating member, Tclow is a low gear speed-side clutch torque, becomes a released-side clutch torque at the time of an upshift, and becomes an engaged-side clutch torque at the time of a downshift. Tchi is a high gear speed-side clutch torque, becomes an engaged-side clutch torque at the time of an upshift, and becomes a released-side clutch torque at the time of a downshift. Constants a1, a2, b1, b2, c1, c2, d1, d2 are used at the time of deriving the mathematical expression (1) and the mathematical expression (2), and are set in design on the basis of inertia in each rotating element and the gear ratio of the planetary gear unit (specific numeric values vary on each shift pattern).

$$\dot{\omega}t = a1 \cdot Tt + b1 \cdot T\text{clow} + c1 \cdot T\text{chi} + d1 \cdot \dot{\omega}o \quad (1)$$

$$\dot{T}o = a2 \cdot Tt + b2 \cdot T\text{clow} + c2 \cdot T\text{chi} + d2 \cdot \dot{\omega}o \quad (2)$$

The mathematical expression (1) and the mathematical expression (2) constitute the equation of motion of gear train of the automatic transmission 18, which formulates the correlation between the shift target values and the control operation amounts. Here, the shift target values are able to express a target value of the shift duration and a target value of the driving force and are allowed to be used in the equation of motion of gear train. In the present embodiment, the input shaft angular acceleration $d\omega t/dt$ is used as an example of the element that is able to express the shift duration. In addition, the transmission output torque To is used as an example of the element that is able to express the driving force. That is, in the present embodiment, the shift target values are set on the basis of two values, that is, the input shaft angular acceleration $d\omega t/dt$ and the transmission output torque To. On the other hand, in the present embodiment, the control operation amounts for establishing those shift target values are set on the basis of three values, that is, the turbine torque Tt (which is equivalent to the engine torque Te), the low gear speed-side clutch torque Tclow and the high gear speed-side clutch torque Tchi. Therefore, the equation of motion is formed of two mathematical expressions, that is, the mathematical expression (1) and the mathematical expression (2); whereas there are three control operation amounts, so it is not possible to uniquely solve the control operation amounts that establish the two shift target values. Therefore, it is not possible to carry out a desired shift of the automatic transmission 18 with the use of the shift model such that the two shift target values are achieved. The output shaft angular acceleration $d\omega o/dt$ is calculated from the transmission output rotation speed $\omega o$ that is a detected value of the rotation speed sensor 54.

Incidentally, it is presumable that it is possible to uniquely solve the control operation amounts by adding a constraint condition to the equation of motion expressed by the mathematical expression (1) and the mathematical expression (2). Here, it is difficult to control an exchange of torque between the released-side engagement device and the engaged-side engagement device (that is, shift progress degree) in shift control over the automatic transmission 18. On the other hand, in the case where any one of the control operation amounts is set to a predetermined value in order to determine the three control operation amounts, there are an infinite number of setting ways, such as the any one of the control operation amounts is set to a predetermined value in accordance with each shift pattern. As for the predetermined value, for example, if only one of the released-side clutch torque and the engaged-side clutch torque is set as the constraint condition, tie-up or racing may easily occur during shifting or controllability of control for causing tie-up or racing during shifting on purpose may decrease. Alternatively, for example, if the variation mode of the engine torque is set as the constraint condition, it may be not possible to execute engine torque reduction control such that the engine torque is temporarily varied during inertia phase. In the present embodiment, it is found that torque shares of transmission torque between the released-side engagement device and the engaged-side engagement device are set as the above-described constraint condition. The torque shares of transmission torque are suitable for expressing or controlling an exchange of torque during shifting, and are compatible with any shift pattern. That is, it is found that the torque shares of transmission torque are set as the above-described constraint condition. The torque shares of transmission torque allow an exchange of torque during shifting to be incorporated into the equation of motion, and allow the control operation amounts to be uniquely solved. The torque shares are the rates of transmission torque shared between the released-side engagement device and the engaged-side engagement device during a shift of the automatic transmission 18 with respect to an input shaft total transmission torque when the total transmission torque is, for example, converted to the torque on the input shaft 16 (input shaft total transmission torque). In the present embodiment, the torque share of the low gear speed engagement device is denoted by "xlow", the torque share of the high gear speed engagement device is denoted by "xhi", and the torque shares are respectively defined by the following mathematical expression (3) and the following mathematical expression (4) using a torque share x (for example, $0 \leq x \leq 1$) that varies in time sequence so as to reflect an exchange of torque during shifting.

$$xlow = x \quad (3)$$

$$xhi = 1 - x \quad (4)$$

The relational expression between the low gear speed-side clutch torque Tclow and the high gear speed-side clutch torque Tchi may be defined using "x" (=xlow) and "1−x" (=xhi) on the basis of "Tclow" and "Tchi", which are converted as torques on the input shaft 16, and the mathematical expression (3) and the mathematical expression (4). From the mathematical expression (1), the mathematical expression (2) and the relational expression between "Tclow" and "Tchi", relational expressions for calculating the turbine torque Tt, the low gear speed-side clutch torque Tclow and the high gear speed-side clutch torque Tchi that are control operation amounts are derived. The turbine torque Tt (equivalent to the engine torque Te) is expressed by a relational expression using "x" xlow), "1−x" (=xhi), the input shaft angular acceleration $d\omega t/dt$, the transmission output torque To, and the like. Similarly, the low gear speed-side clutch torque Tclow is expressed by a relational expression using "x" (=xlow), the input shaft angular acceleration $d\omega t/dt$, the transmission output torque To, and the like. Similarly, the high gear speed-side clutch torque Tchi is expressed by a relational expression using "1−x" (=xhi), the input shaft angular acceleration $d\omega t/dt$, the transmission output torque To, and the like. That is, the shift model according to the present embodiment is to calculate the control operation amounts on the basis of the shift target values using the equation of motion (the above-described mathematical expressions (1), (2)) of the automatic transmission 18, including the shift target values and the control operation amounts, and the relationships (the above-described mathematical expressions (3), (4)) that respectively express the torque shares. In this way, in the present embodiment, by adding the constraint condition set for the torque share x to the mathematical expressions (1), (2), a shift of the automatic transmission 18 is carried out with the use of the shift model. Thus, even when there are three control operation amounts for two shift target values, it is possible to appropriately determine the three control operation amounts with the use of the above-described shift model.

Incidentally, in shift control over the automatic transmission 18, there are various shift patterns (shift modes), such as a power-on upshift, a power-off upshift, a power-on downshift and a power-off downshift. Therefore, it is desirable to set the torque shares in accordance with each shift pattern. Hereinafter, setting of the torque shares in accordance with each shift pattern will be described in detail.

In a power-on upshift or a power-off downshift, a direction in which the turbine rotation speed $\omega t$ (that is, the transmission input rotation speed $\omega i$) is varied by the engine torque Te (a positive torque at the time of power on or a negative torque (engine friction torque) at the time of power off) differs from a direction in which the turbine rotation speed $\omega t$ varies as a result of the shift (direction in which the turbine rotation speed $\omega t$ is varied as a result of the shift). That is, in a power-on upshift or a power-off downshift, it is not possible to cause the shift to spontaneously progress using the engine torque Te. Thus, it is not possible to cause the shift to progress only by decreasing the absolute value of the released-side clutch torque (that is, only by gradually releasing the released-side engagement device) without changing the torque shares, the shift is not caused to progress, so it is required to vary the turbine rotation speed ωt in the variation direction as a result of the shift with the use of the engaged-side engagement device. In the case where the shift pattern is a power-on upshift or a power-off downshift, as shown in FIG. 3A and FIG. 3D, in order to cause the shift to appropriately progress, the timing at which the torque shares are varied is set to timing before the start of inertia phase (that is, an exchange of torque between the released-side engagement device and the engaged-side engagement device is carried out before the start of inertia phase).

On the other hand, in a power-off upshift or a power-on downshift, the turbine rotation speed ωt is varied by the engine torque Te in the variation direction as a result of the shift. That is, in a power-off upshift or a power-on downshift, it is possible to cause the shift to spontaneously progress using the engine torque Te. Thus, it is possible to cause the shift to progress only by decreasing the absolute value of the released-side clutch torque without changing the torque shares, so it is not required to vary the turbine rotation speed ωt in the variation direction as a result of the shift with the use of the engaged-side engagement device. In a power-off upshift or a power-on downshift, if the shift is caused to progress with the use of the engaged-side engagement device, inertia torque may increase and, as a result, a shift shock may deteriorate on the contrary. Therefore, in the case where the shift pattern is a power-off upshift or a power-on downshift, as shown in FIG. 3C and FIG. 3B, the timing at which the torque shares are varied is set to the end of inertia phase in order to cause the shift to appropriately progress. That is, in the case of a power-off upshift or a power-on downshift, in order to achieve a smooth shift in which a shift shock is suppressed, after the shift is caused to progress only by releasing the released-side engagement device in accordance with the engine torque Te, the turbine rotation speed ωt is adjusted to post-shift synchronous rotation with the use of the engaged-side engagement device by carrying out an exchange of torque between the released-side engagement device and the engaged-side engagement device at the end of inertia phase. Here, the end of inertia phase is, for example, timing at which the turbine rotation speed ωt is substantially close to post-shift synchronous rotation that indicates that the inertia phase has been almost completed. That is, the end of inertia phase is the timing close to the end of inertia phase. After inertia phase is started and is caused to further progress by the engine torque Te and releasing of the released-side engagement device, the engaged-side engagement device just needs to be controlled to gradually engage only at the point at which the turbine rotation speed ωt is synchronized with the post-shift rotation speed at the end of inertia phase even when the engaged-side engagement device is not caused to gradually engage. When it is possible to cause inertia phase to progress and to be completed by the engine torque Te and releasing of the released-side engagement device, the end of inertia phase may be set to timing after the end of inertia phase.

In this way, when the shift pattern varies, the manner of progress of a shift also varies. Therefore, in the present embodiment, in order to cause a shift to appropriately progress in accordance with the shift pattern, the timing at which the torque shares are varied is changed on the basis of the shift pattern (that is, the timing at which torque is exchanged between the released-side engagement device and the engaged-side engagement device is changed on the basis of the shift pattern).

More specifically, in FIG. 2, the shift control unit 74 determines whether the automatic transmission 18 is shifting speeds on the basis of, for example, whether a shift determined to be carried out has not been finished yet. In addition, the shift control unit 74 determines whether the shift pattern during shifting is a power-on upshift or a power-off downshift on the basis of, for example, the accelerator operation amount Acc and a gear speed into which the automatic transmission 18 should be shifted.

A control operation amount calculation unit 76 calculates the control operation amounts on the basis of the shift target values with the use of the shift model when the shift control unit 74 has determined that the automatic transmission 18 is shifting speeds. Specifically, the control operation amount calculation unit 76 includes a torque share calculation unit 78 and a shift target value calculation unit 80.

The torque share calculation unit 78, for example, calculates the torque share x on the basis of an elapsed time from the start of shift control (or the last calculation timing) from a correlation (shift progress degree map) in which a mode for varying the torque share x is predetermined. The torque share calculation unit 78 calculates the torque share xlow of the low gear speed engagement device and the torque share xhi of the high gear speed engagement device on the basis of the calculated torque share x from the mathematical expression (3) and the mathematical expression (4). An initial value of the torque share x is set to 1 for an upshift, and is set to 0 for a downshift.

The shift progress degree map is, for example, predetermined for each shift pattern and each pair of speeds. The torque share calculation unit 78 selects the shift progress degree map in which the timing at which the torque shares are varied is set to timing before the start of inertia phase when the shift control unit 74 has determined that the shift pattern is a power-on upshift or a power-off downshift. On the other hand, the torque share calculation unit 78 selects the shift progress degree map in which the timing at which the torque shares are varied is set to the end of inertia phase when the shift control unit 74 has determined that the shift pattern is not a power-on upshift or a power-off downshift. When the shift progress degree map in which the timing at which the torque shares are varied is set to the end of inertia phase has been selected, the torque share x may be calculated on the basis of an elapsed time from the start of inertia phase.

The shift target value calculation unit 80, for example, calculates a target value of the input shaft angular acceleration dωt/dt during inertia phase on the basis of an elapsed time from the start of inertia phase (or the last calculation timing) from a correlation (input shaft angular acceleration variation map) in which a mode for varying the input shaft angular acceleration dωt/dt is predetermined such that a variation in the turbine rotation speed ωt (=transmission input rotation speed ωi) during inertia phase becomes a predetermined variation that achieves a suppressed shift shock and a shift duration. In addition, the shift target value calculation unit 80, for example, other than during inertia phase, calculates a target value of the input shaft angular acceleration dωt/dt on the basis of a variation in the turbine rotation speed ωt (=transmission input rotation speed ωi). In addition, the shift target value calculation unit 80, for example, calculates a target value of the transmission output torque To on the basis of the required driving force Fdem calculated by the engine output control unit 72 and an elapsed time from the start of shift control (or the last calculation timing) from a correlation (transmission output torque variation map) in which a mode for varying the transmission output torque To is predetermined. The input shaft angular acceleration variation map and the transmission output torque variation map are, for example, predetermined for each shift pattern and each pair of speeds.

The control operation amount calculation unit 76 calculates respective required values of the turbine torque Tt (equivalent to the engine torque Te), low gear speed-side clutch torque Tclow and high gear speed-side clutch torque Tchi as the control operation amounts on the basis of the torque shares (x, xlow, xhi) of the engagement devices, calculated by the torque share calculation unit 78, and the shift target values (target values of $t\omega t/dt$, To) calculated by the shift target value calculation unit 80 from the relational expressions for calculating the control operation amounts.

When the shift control unit 74 has determined that the automatic transmission 18 is shifting speeds, the engine output control unit 72 outputs the engine output control command signal Se such that the required value of the turbine torque Tt (equivalent to the engine torque Te), calculated by the control operation amount calculation unit 76, is obtained. When the shift control unit 74 has determined to carry out a shift of the automatic transmission 18, the shift control unit 74 outputs the hydraulic pressure command signal Sp for obtaining the required values of the low gear speed-side clutch torque Tclow and high gear speed-side clutch torque Tchi, calculated by the control operation amount calculation unit 76, to the hydraulic control circuit 28 such that the determined gear is achieved.

Figure 4:
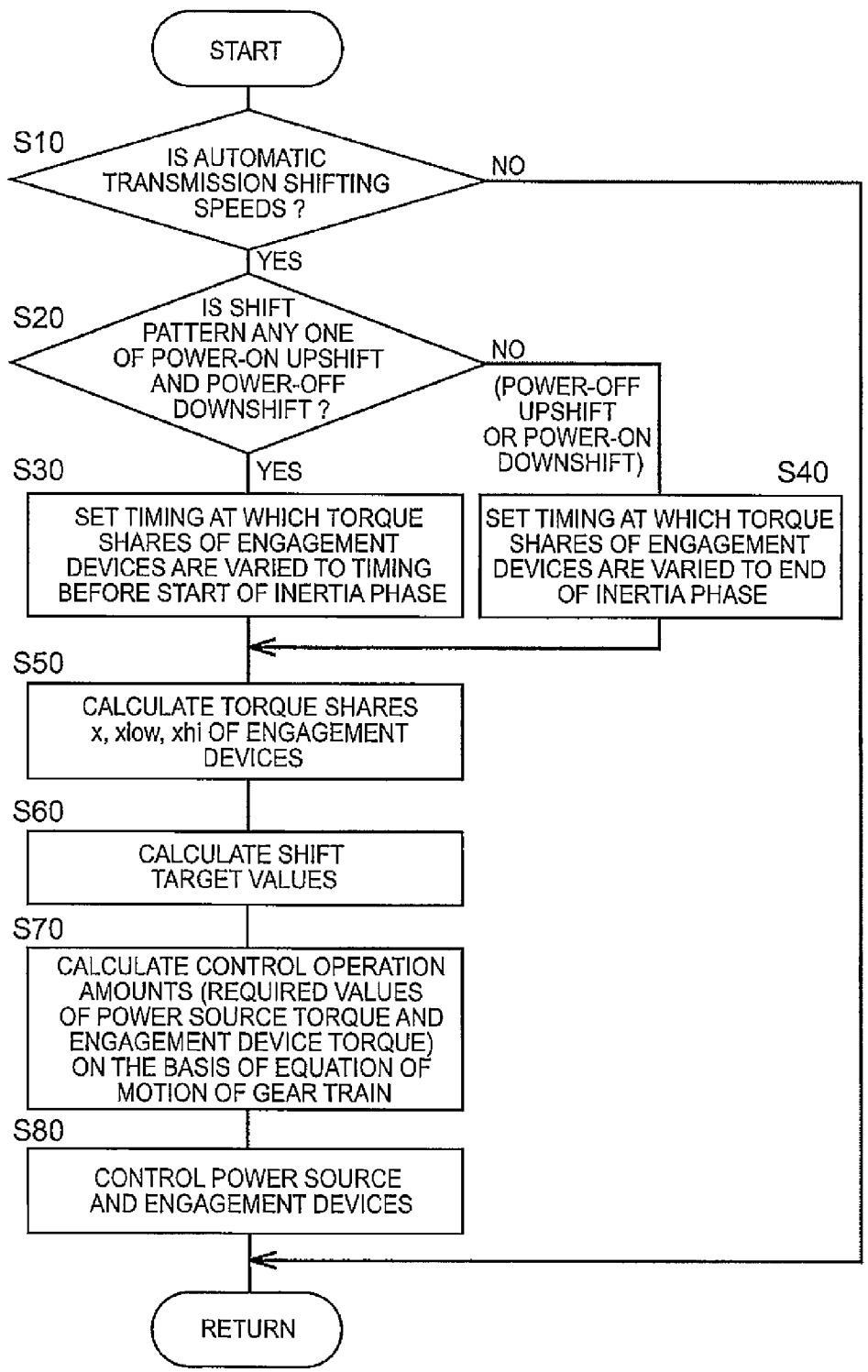
FIG. 4 is a flowchart that illustrates control operations for carrying out a desired shift of an automatic transmission with the use of the relevant portion of the control functions of the electronic control unit, that is, a shift model.
Figure 5:
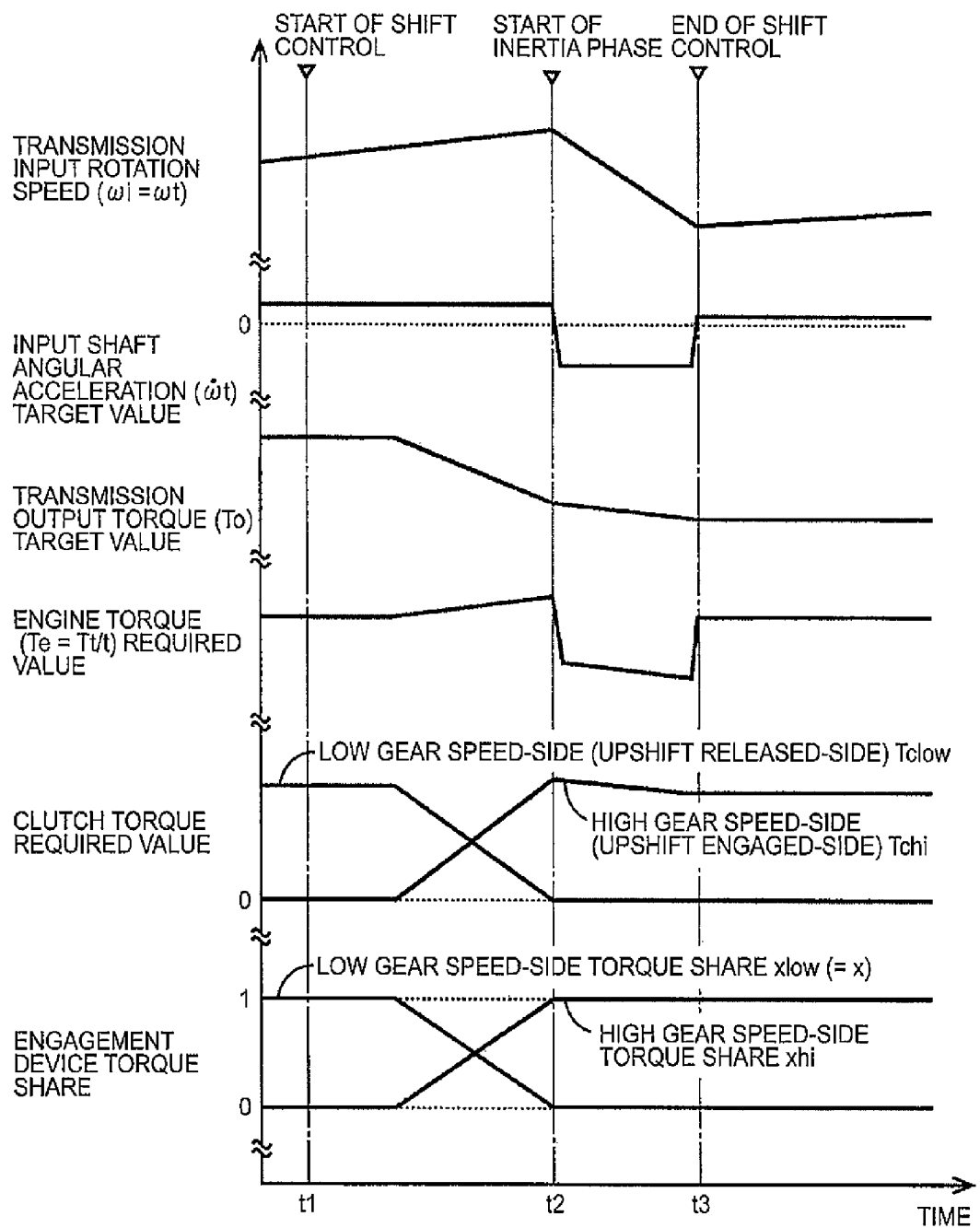
FIG. 5 is a time chart in the case where the control operations shown in the flowchart of FIG. 4 are executed, and is an example at the time of a power-on upshift.

FIG. 4 is a flowchart that illustrates a relevant portion of control functions of the electronic control unit 70, that is, control operations for carrying out a desired shift of the automatic transmission 18 with the use of the shift model, and is, for example, repeatedly executed at an extremely short cycle time of about several milliseconds to several tens of milliseconds. FIG. 5 is a time chart in the case where the control operations shown in the flowchart of FIG. 4 are executed, and is an example at the time of a power-on upshift.

In FIG. 4, initially, in step (hereinafter, step is omitted) S10 corresponding to the shift control unit 74, for example, it is determined whether the automatic transmission 18 is shifting speeds. When negative determination is made in S10, the routine ends. When affirmative determination is made in S10 (time t1 to time t3 in FIG. 5), it is determined in S20 corresponding to the shift control unit 74 whether the shift pattern of the shift is any one of a power-on upshift and a power-off downshift. When affirmative determination is made in S20, for example, the shift progress degree map in which the timing at which the torque shares are varied is set to timing before the start of inertia phase is selected in S30 corresponding to the torque share calculation unit 78. That is, the timing at which the torque shares are varied is set to timing before the start of inertia phase (from time t1 to time t2 in FIG. 5, and see FIG. 3A and FIG. 3D). On the other hand, when negative determination is made in S20, for example, the shift progress degree map in which the timing at which the torque shares are varied is set to the end of inertia phase is selected in S40 corresponding to the torque share calculation unit 78. That is, the timing at which the torque shares are varied is set to the end of inertia phase (see FIG. 3B and FIG. 3C). Subsequent to S30 or S40, in S50 corresponding to the torque share calculation unit 78, for example, the torque shares (x, xlow, xhi) of the engagement devices are calculated using the selected shift progress degree map. After that, in S60 corresponding to the shift target value calculation unit 80, the shift target values (the respective target values of the input shaft angular acceleration $d\omega t/dt$ and transmission output torque To) are calculated. Then, in S70 corresponding to the control operation amount calculation unit 76, the control operation amounts (the required values of the engine torque Te, low gear speed-side clutch torque Tclow and high gear speed-side clutch torque Tchi) are calculated on the basis of the torque shares of the engagement devices, calculated in S50, and the shift target values calculated in S60 from the relational expressions for calculating the control operation amounts. Subsequently, in S80 corresponding to the engine output control unit 72 and the shift control unit 74, the engine output control command signal Se and the hydraulic pressure command signal Sp are output, and the engine 12, the released-side engagement device and the engaged-side engagement device are controlled such that the control operation amounts calculated in S70 are obtained.

In FIG. 5, for example, the transmission output torque To may be rapidly varied by inertia torque during inertia phase. However, in the present embodiment, in order to suppress occurrence of a shift shock, the target value of the transmission output torque To during inertia phase is set to a target value as if there is no inertia torque. Then, the required value of the engine torque Te, which achieves the target value, is determined, and engine torque reduction control for cancelling inertia torque is executed. In this way, in the present embodiment, the engine 12 is incorporated into the equation of motion as a controlled object without collapsing the entire shift model control. The embodiment shown in FIG. 5 refers to a power-on upshift, so, in order to cause the shift to appropriately progress, an exchange of torque between the released-side engagement device and the engaged-side engagement device is carried out before the start of inertia phase.

As described above, in a situation that the equation of motion including the mathematical expression (1) and the mathematical expression (2) is not solved unless a constraint condition is set for the equation of motion, the torque share x is set as the constraint condition in the present embodiment. Therefore, it is suitable to control an exchange of torque between the engagement devices, which is difficult in shift control, and it is possible to solve the equation of motion. In other words, the torque share x that expresses an exchange of torque is set as the constraint condition, so it is possible to handle any shift pattern with the use of a single shift model. Specifically, by setting the torque share x suitable to control the shift progress degree as the constraint condition, occurrence of tie-up or racing is suppressed, and, conversely, the controllability of control for causing tie-up or racing on purpose improves. It is possible to appropriately execute engine torque reduction control. In this way, according to the present embodiment, even when there are three control operation amounts for two shift target values, it is possible to appropriately determine the three control operation amounts with the use of the shift model and then carry out a desired shift of the automatic transmission 18 such that the two shift target values are achieved.

In addition, according to the present embodiment, the timing at which the torque shares are varied is changed on the basis of the shift pattern, so it is possible to cause the shift to appropriately progress in accordance with the shift pattern. Thus, in the present embodiment, it is possible to further appropriately carry out a desired shift of the automatic transmission 18 with the use of the shift model.

In addition, according to the present embodiment, when the shift pattern is a power-on upshift or a power-off downshift, the timing at which the torque shares are varied is set to the timing before the start of inertia phase, so a shift is appropriately caused to progress by the engaged-side engagement device. On the other hand, when the shift pattern is a power-off upshift or a power-on downshift, the timing at which the torque shares are varied is set to the end of inertia phase, so a shift is appropriately caused to progress only by decreasing the absolute value of the torque of the released-side engagement device. In other words, when the shift pattern is a power-off upshift or a power-on downshift, the possibility of deterioration of a shift shock is avoided by not setting the timing at which the torque shares are varied to the timing before the start of inertia phase, so it is possible to achieve a smooth shift by setting the timing at which the torque shares are varied to the end of inertia phase.

In addition, according to the present embodiment, the control operation amounts are calculated on the basis of the shift target values using the equation of motion including the mathematical expression (1) and the mathematical expression (2) and the relationships of the mathematical expression (3) and the mathematical expression (4), so it is possible to incorporate control associated with an exchange of torque, which is difficult in shift control, into the above equation of motion, and it is possible to appropriately determine the three control operation amounts.

Next, another embodiment (second embodiment) of the invention will be described. Like reference numerals denote mutually common portions between the embodiments in the following description, and the description thereof is omitted.

In the above-described first embodiment, as shown in the time chart of FIG. 5, the target value of the transmission output torque To during inertia phase is determined on the assumption that it is possible to cancel inertial torque in engine torque reduction control. Incidentally, there is presumably a case where only part of inertia torque can be apparently cancelled depending on the shift pattern, each pair of speeds, the vehicle speed V at the time of the shift, the state of the engine 12, and the like. Therefore, in such a case, the shift target value calculation unit 80 according to the second embodiment sets the target value of the transmission output torque To during inertia phase on the assumption that it is possible to cancel only part of inertia torque in engine torque reduction control. Therefore, the target value of the transmission output torque To during inertia phase includes inertia torque that cannot be cancelled, so the target value is significantly varied at the start of inertia phase or the end of inertia phase. At this time, as shown in FIG. 5, when the required value of one clutch torque (here, the released-side clutch torque) is zero as a result of completion of an exchange of torque between the engagement devices, an actual transmission output torque To or an actual input shaft angular acceleration $d\omega t/dt$ may rapidly vary from the target value or a shift shock may increase because of racing of the turbine rotation speed $\omega t$ due to a response delay, variations, or the like, of actual values with respect to the control operation amounts (the required values of clutch torque and engine torque).

In the second embodiment, by causing tie-up in an exchange of torque between the engagement devices, the rapid variation or racing is suppressed. For example, by increasing at least one of the low gear speed-side clutch torque Tclow and the high gear speed-side clutch torque Tchi to compensate for a variation in the transmission output torque To, the variation in the transmission output torque To is relieved or racing of the turbine rotation speed $\omega t$ is suppressed. Hereinafter, an example of the way of causing tie-up will be described. In the above-described first embodiment, a combined total of the torque share xlow of the low gear speed engagement device and the torque share xhi of the high gear speed engagement device is "1 (=xlow+xhi)", and is set such that neither tie-up nor racing is caused. In contrast to this, in the second embodiment, as shown in the following mathematical expression (5) and mathematical expression (6), a torque, share including a tie-up degree α (tie-up rate α) is used as at least one of the torque share xlow and the torque share xhi.

$$xlow = x + \alpha \quad (5)$$

$$xhi = (1-x) + \alpha \quad (6)$$

More specifically, the control operation amount calculation unit 76 directly uses the target values of the input shaft angular acceleration $d\omega t/dt$ and transmission output torque To, calculated by the shift target value calculation unit, in the relational expressions for calculating the control operation amounts. The control operation amount calculation unit 76, at the time of calculating the turbine torque Tt, directly uses the torque share x of the engagement device, calculated by the torque share calculation unit 78, in the above relational expressions. On the other hand, the control operation amount calculation unit 76 uses a torque share xlow or a torque share xhi (mathematical expressions (5), (6)) including the tie-up degree α in the above relational expressions at the time of calculating a clutch torque of a predetermined engagement device, of which the clutch torque is increased in order to cause tie-up and which is selected from between the low gear speed-side clutch torque Tclow and the high gear speed-side clutch torque Tchi.

Incidentally, as described in the first embodiment, there are various shift patterns in shift control over the automatic transmission 18, and the timing at which torque is exchanged between the released-side engagement device and the engaged-side engagement device is changed in accordance with each shift pattern. On the other hand, at the time of causing tie-up, for example, it is desirably less likely to influence a transmission torque and, by extension, an actual transmission output torque To or less likely to influence the progress of a shift even when the clutch torque is increased. Hereinafter, setting of the predetermined engagement device in accordance with each shift pattern will be described in detail. Basically, in a state where there is no differential rotation between members on both sides of the engagement device, the transmission torque does not increase even when the clutch torque is increased. Therefore, the predetermined engagement device is, for example, an engagement device that is placed in a state where there is no differential rotation at the start of an exchange of torque.

Here, in a power-on upshift or a power-off downshift, as described above, the timing at which the torque shares are varied is set to the timing before the start of inertia phase. Therefore, before the start of inertia phase, even when the tie-up degree a, is added to the released-side engagement device, it does not influence an actual transmission output torque To. In addition, by adding the tie-up degree a to the released-side engagement device, it is possible to appropriately suppress a rapid variation in actual transmission output torque To or input shaft angular acceleration $d\omega t/dt$ after the start of inertia phase. Then, when the shift pattern is a power-on upshift or a power-off downshift, the predetermined engagement device to which the tie-up degree α is added is set to the released-side engagement device as shown in the table of FIG. 6.

On the other hand, in a power-off upshift or a power-on downshift, as described above, the timing at which the torque shares are varied is set to the end of inertia phase. Therefore, when the tie-up degree α is added to the released-side engagement device during inertia phase, the progress of a shift is influenced. In contrast, when the tie-up degree α is added to the engaged-side engagement device, the tie-up degree α is added at the end of inertia phase, so it is less likely to influence the progress of a shift through releasing of the released-side engagement device. In addition, by adding the tie-up degree a to the engaged-side engagement device, it is possible to appropriately suppress racing of the turbine rotation speed ωt at the end of inertia phase. Therefore, when the shift pattern is a power-off upshift or a power-on downshift, the predetermined engagement device to which the tie-up degree cc is added is set to the engaged-side engagement device as shown in the table of FIG. 6.

In this way, when the shift pattern varies, the manner of progress of a shift also varies. Therefore, in the second embodiment, the predetermined engagement device is changed on the basis of the shift pattern in order to appropriately suppress a shift shock in accordance with the shift pattern.

Figure 7:
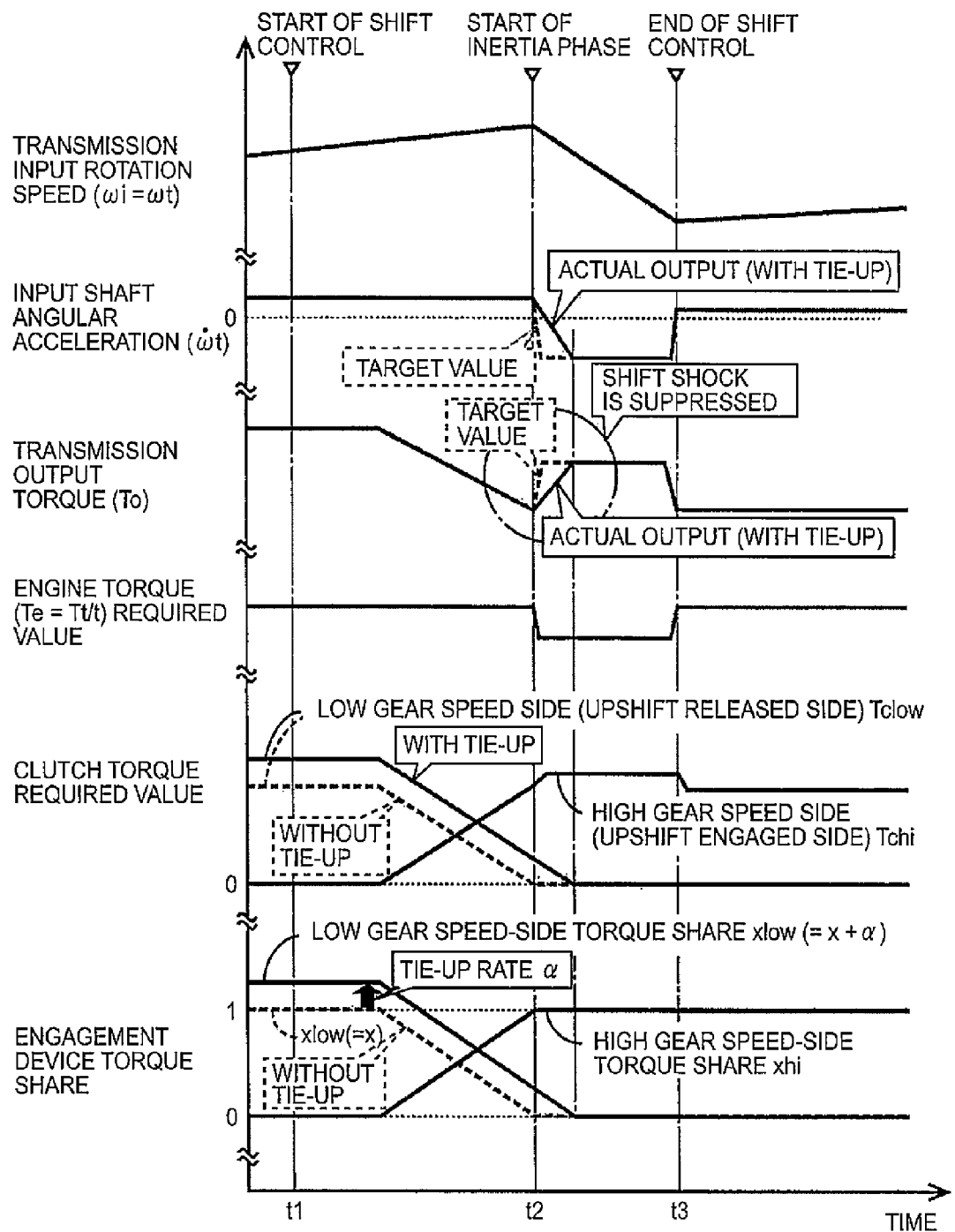
FIG. 7 is a time chart in the case where the control operations shown in the flowchart of FIG. 4 are executed, and is an example at the time when tie-up is caused during a power-on upshift.

In the second embodiment as well, basically, control operations are executed in accordance with the flowchart of FIG. 4. In the second embodiment, the torque share including the tie-up degree cc is used to calculate the clutch torque of the predetermined engagement device. FIG. 7 is a time chart in the case where the control operations shown in the flowchart of FIG. 4 are executed, and is an example at the time when tie-up is caused during a power-on upshift.

In FIG. 7, the broken lines respectively indicate shift target values and indicate control operation amounts at the time of achieving those shift target values, and show an example in the case where no tie-up is caused. The solid lines show an example in the case where tie-up is caused while the shift target values remain unchanged. During inertia phase, the target value of the transmission output torque To is increased by an inertia torque that cannot be cancelled through engine torque reduction control, so the target value of the transmission output torque To is significantly varied after the start of inertia phase. In contrast, the torque share including the tie-up degree α is used as the torque share xlow of the released-side engagement device that serves as the predetermined engagement device at the time of a power-on upshift, and tie-up is caused. Thus, a variation in actual transmission output torque To and a variation in actual input shaft angular acceleration dωt/dt after the start of inertia phase are reduced as compared to the target values.

As described above, according to the second embodiment, in addition to the advantageous effects similar to those of the above-described first embodiment, the torque share including the tie-up degree α is used to determine the torque capacity of the predetermined engagement device, and an exchange of torque of the engagement device is controlled toward tie-up side. Therefore, it is possible to smoothly exchange the torque, and it is possible for the predetermined engagement device to share the rapid variation amount and also possible to suppress the racing, so a shift shock that may increase at the time when the shift target values significantly change is suppressed. In addition, the predetermined engagement device is changed on the basis of the shift pattern, so it is possible to further appropriately suppress a shift shock in accordance with the shift pattern.

In addition, according to the second embodiment, when the shift pattern is a power-on upshift or a power-off downshift, the predetermined engagement device is set for the released-side engagement device; whereas, when the shift pattern is a power-off upshift or a power-on downshift, the predetermined engagement device is set for the engaged-side engagement device, so it is less likely to influence an actual transmission output torque To or it is less likely to influence the progress of a shift.

The embodiments of the invention are described in detail with reference to the drawings, and the invention is also applicable to other embodiments.

For example, in the above-described embodiments, each embodiment is implemented independently of each other; however, each embodiment does not always need to be implemented independently of each other, and the embodiments may be implemented in combination as needed.

In the above-described embodiments, the output shaft 20 is illustrated as the output shaft 20-side rotating member; however, the output shaft 20-side rotating member is not limited to the output shaft 20. The output shaft 20-side rotating member may be a rotating member in the power transmission path from the output shaft 20 to the drive wheels 26. The input shaft 16 is illustrated as the input shaft 16-side rotating member; however, the input shaft 16-side rotating member is not limited to the input shaft 16. The input shaft 16-side rotating member may be a rotating member in the power transmission path from the engine 12 to the input shaft 16.

In the above-described first and second embodiments, the case where it is possible to cancel only part of inertia torque through engine torque reduction control is illustrated as the case where the target value of the transmission output torque To is significantly varied at the start of inertia phase or the end of inertia phase; however, the case where the target value of the transmission output torque To is significantly varied is not limited to the case where it is possible to cancel only part of inertia torque. In short, as long as the target value of the transmission output torque To is set so as to be significantly varied at the start of inertia phase or the end of inertia phase, the invention is applicable.

The above-described embodiments are only illustrative, and the invention may be implemented in modes including various modifications and improvements on the basis of the knowledge of persons skilled in the art.

What is claimed is:

1. A controller for a vehicle including an automatic transmission that has a plurality of engagement devices, the plurality of engagement devices transmitting rotation and torque between an input shaft that receives power from a driving force source and an output shaft that transmits power to a drive wheel, the automatic transmission being shifted by switching between engaged and released states of each of the engagement devices, the controller comprising:

a shift control unit configured to i) carry out a shift of the automatic transmission with the use of a predetermined shift model that determines control operation amounts for achieving shift target values, ii) carry out the shift of the automatic transmission with the use of the shift model by setting the shift target values on the basis of a torque on a rotating member on the output shaft side and a speed variation amount of a rotating member on the input shaft side, setting the control operation amounts on the basis of a torque on the rotating member on the input shaft side, a torque capacity of an engaged one of the engagement devices during the shift and a torque capacity of a released one of the engagement devices during the shift, and setting torque shares of a transmission torque between the engaged one of the engagement devices and the released one of the engagement devices during the shift when the transmission torque is converted to the torque on the rotating member on the input shaft side, and iii) change timing at which the torque shares are varied on the basis of a shift pattern; wherein
the shift control unit is configured to:
set the timing at which the torque shares are varied to a timing before a start of inertia phase when the shift pattern is a power-on upshift or a power-off downshift,
set the timing at which the torque shares are varied to an end of inertia phase when the shift pattern is a power-off upshift or a power-on downshift,
determine a torque capacity of a predetermined engagement device, selected from between the engaged-side engagement device and the released-side engagement device, using a torque share, including a tie-up rate, as the torque share,
change the predetermined engagement device between the engaged-side engagement device and the released-side engagement device on the basis of the shift pattern, wherein
the released-side engagement device is set as the predetermined engagement device when the shift pattern is a power-on upshift or a power-off downshift, and
the engaged-side engagement device is set as the predetermined engagement device when the shift pattern is a power-off upshift or a power-on downshift.

2. The control device according to claim 1, wherein the shift control unit is configured to calculate the control operation amounts on the basis of the shift target values by using an equation of motion of the automatic transmission and a relationship, as the shift model
the equation includes the shift target values and the control operation amounts, and
the relationship expresses the torque shares.

3. A control method for a vehicle including an automatic transmission that has a plurality of engagement devices, the plurality of engagement devices transmitting rotation and torque between an input shaft that receives power from a driving force source and an output shaft that transmits power to a drive wheel, the automatic transmission being shifted by switching between engaged and released states of each of the engagement devices, the control method comprising:
carrying out a shift of the automatic transmission with the use of a predetermined shift model that determines control operation amounts for achieving shift target values;
carrying out the shift of the automatic transmission with the use of the shift model by
setting the shift target values on the basis of a torque on a rotating member on the output shaft side and a speed variation amount of a rotating member on the input shaft side,
setting the control operation amounts on the basis of a torque on the rotating member on the input shaft side, a torque capacity of an engaged one of the engagement devices during the shift and a torque capacity of a released one of the engagement devices during the shift, and
setting torque shares of a transmission torque between the engaged one of the engagement devices and the released one of the engagement devices during the shift when the transmission torque is converted to the torque on the rotating member on the input shaft side;
changing timing at which the torque shares are varied on the basis of a shift pattern;
determining a torque capacity of a predetermined engagement device, selected from between the engaged-side engagement device and the released-side engagement device, using a torque share, including a tie-up rate, as the torque share,
changing the predetermined engagement device between the engaged-side engagement device and the released-side engagement device on the basis of the shift pattern, wherein
the released-side engagement device is set as the predetermined engagement device when the shift pattern is a power-on upshift or a power-off downshift, and
the engaged-side engagement device is set as the predetermined engagement device when the shift pattern is a power-off upshift or a power-on downshift;
wherein
the timing at which the torque shares are varied is set to a timing before a start of inertia phase when the shift pattern is a power-on upshift or a power-off downshift, and
the timing at which the torque shares are varied is set to an end of inertia phase when the shift pattern is a power-off upshift or a power-on downshift.

* * * * *